(12) United States Patent
Hogue et al.

(10) Patent No.: US 8,954,426 B2
(45) Date of Patent: *Feb. 10, 2015

(54) QUERY LANGUAGE

(75) Inventors: Andrew W. Hogue, Ho Ho Kus, NJ (US); Douglas L. T. Rohde, Pelham, NY (US)

(73) Assignee: Google Inc., Mountain View, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/356,679

(22) Filed: Feb. 17, 2006

(65) Prior Publication Data

US 2007/0198480 A1   Aug. 23, 2007

(51) Int. Cl.
*G06F 7/00* (2006.01)
*G06F 17/30* (2006.01)

(52) U.S. Cl.
CPC .................. *G06F 17/30908* (2013.01)
USPC ............................................ 707/728; 707/803

(58) Field of Classification Search
USPC ................... 707/728, 803, 999.003
See application file for complete search history.

(56) References Cited

U.S. PATENT DOCUMENTS

| | | | |
|---|---|---|---|
| 4,888,690 A | 12/1989 | Huber | 364/200 |
| 4,899,292 A | 2/1990 | Montagna et al. | 364/521 |
| 5,010,478 A | 4/1991 | Deran | |
| 5,202,982 A * | 4/1993 | Gramlich et al. | 1/1 |
| 5,475,819 A | 12/1995 | Miller et al. | |
| 5,528,549 A * | 6/1996 | Doddington et al. | 365/230.03 |
| 5,528,550 A * | 6/1996 | Pawate et al. | 365/230.03 |
| 5,544,051 A | 8/1996 | Senn et al. | 364/419.19 |
| 5,560,005 A | 9/1996 | Hoover et al. | |
| 5,574,898 A | 11/1996 | Leblang et al. | |
| 5,664,109 A | 9/1997 | Johnson et al. | |
| 5,778,378 A | 7/1998 | Rubin | |
| 5,815,415 A | 9/1998 | Bentley et al. | 364/578 |
| 5,832,479 A | 11/1998 | Berkowitz et al. | 707/3 |
| 5,870,739 A | 2/1999 | Davis, III et al. | 707/4 |
| 5,905,980 A | 5/1999 | Masuichi et al. | 707/1 |
| 5,938,717 A * | 8/1999 | Dunne et al. | 701/117 |
| 5,946,692 A | 8/1999 | Faloutsos et al. | 707/101 |
| 5,963,940 A | 10/1999 | Liddy et al. | 707/5 |
| 6,006,221 A | 12/1999 | Liddy et al. | 707/5 |
| 6,014,661 A | 1/2000 | Ahlberg et al. | 707/3 |
| 6,026,388 A | 2/2000 | Liddy et al. | 707/1 |
| 6,029,195 A | 2/2000 | Herz | 709/219 |

(Continued)

FOREIGN PATENT DOCUMENTS

| | | | |
|---|---|---|---|
| DE | 10245900 A1 | 4/2004 | G06K 9/62 |
| JP | 11-265400 | 9/1999 | |

(Continued)

OTHER PUBLICATIONS

Peter Anick, "Using Terminological Feedback for Web Search Refinement—A Log-based Study". ACM 2003.*

(Continued)

*Primary Examiner* — Daniel Kuddus

(74) *Attorney, Agent, or Firm* — Morgan, Lewis & Bockius LLP

(57) ABSTRACT

A fact repository supports searches of facts relevant to search queries comprising keywords and phrases. A service engine retrieves the objects that are associated with facts relevant to a query. The query language described is designed for use with such a repository of facts and searches both the attributes of facts and the values of the attributes.

21 Claims, 14 Drawing Sheets

Example Format of Facts in Repository (each fact is associated with an object ID)

(56) References Cited

U.S. PATENT DOCUMENTS

| | | | |
|---|---|---|---|
| 6,038,560 A | 3/2000 | Wical | |
| 6,101,515 A | 8/2000 | Wical et al. | 707/531 |
| 6,105,020 A | 8/2000 | Lindsay et al. | 707/2 |
| 6,105,030 A | 8/2000 | Syed et al. | 707/10 |
| 6,192,357 B1 * | 2/2001 | Krychniak | 1/1 |
| 6,216,138 B1 | 4/2001 | Wells et al. | 707/502 |
| 6,222,540 B1 | 4/2001 | Sacerdoti | 345/339 |
| 6,249,784 B1 | 6/2001 | Macke et al. | |
| 6,263,328 B1 | 7/2001 | Coden et al. | |
| 6,263,335 B1 | 7/2001 | Paik et al. | 707/5 |
| 6,304,864 B1 | 10/2001 | Liddy et al. | 706/15 |
| 6,311,189 B1 | 10/2001 | deVries et al. | 707/102 |
| 6,326,962 B1 | 12/2001 | Szabo | 345/348 |
| 6,327,574 B1 | 12/2001 | Kramer et al. | 705/14 |
| 6,363,179 B1 | 3/2002 | Evans et al. | 382/309 |
| 6,377,943 B1 | 4/2002 | Jakobsson | 707/2 |
| 6,480,194 B1 | 11/2002 | Sang'udi et al. | 345/440 |
| 6,519,631 B1 | 2/2003 | Rosenschein et al. | 709/217 |
| 6,529,900 B1 | 3/2003 | Patterson et al. | 707/3 |
| 6,584,464 B1 | 6/2003 | Warthen | 707/4 |
| 6,606,659 B1 | 8/2003 | Hegli et al. | |
| 6,609,123 B1 * | 8/2003 | Cazemier et al. | 1/1 |
| 6,629,097 B1 | 9/2003 | Keith | 707/5 |
| 6,643,641 B1 | 11/2003 | Snyder | 707/4 |
| 6,718,324 B2 | 4/2004 | Edlund et al. | 707/5 |
| 6,772,150 B1 * | 8/2004 | Whitman et al. | 707/721 |
| 6,801,548 B1 * | 10/2004 | Duschatko et al. | 370/537 |
| 6,832,218 B1 | 12/2004 | Emens et al. | 707/3 |
| 6,850,896 B1 | 2/2005 | Kelman et al. | 705/10 |
| 6,873,982 B1 | 3/2005 | Bates et al. | 707/5 |
| 6,885,990 B1 | 4/2005 | Ohmori et al. | 704/20 |
| 6,928,436 B2 | 8/2005 | Baudel | 707/6 |
| 6,961,723 B2 | 11/2005 | Faybishenko et al. | 707/3 |
| 6,968,343 B2 | 11/2005 | Charisius et al. | 707/102 |
| 7,013,308 B1 | 3/2006 | Tunstall-Pedoe | 707/104.1 |
| 7,031,955 B1 | 4/2006 | de Souza et al. | 707/3 |
| 7,043,521 B2 | 5/2006 | Eitel | 709/202 |
| 7,100,083 B2 | 8/2006 | Little et al. | 714/26 |
| 7,146,538 B2 | 12/2006 | Johnson et al. | 714/30 |
| 7,158,983 B2 | 1/2007 | Willse et al. | 707/101 |
| 7,421,432 B1 * | 9/2008 | Hoelzle et al. | 1/1 |
| 7,669,115 B2 | 2/2010 | Cho et al. | 715/212 |
| 7,953,720 B1 | 5/2011 | Rohde et al. | |
| 8,065,290 B2 | 11/2011 | Hogue | |
| 8,112,441 B2 * | 2/2012 | Ebaugh et al. | |
| 8,352,388 B2 | 1/2013 | Estes | |
| 8,463,810 B1 | 6/2013 | Rennison | |
| 8,510,321 B2 | 8/2013 | Ranganathan et al. | |
| 8,620,909 B1 | 12/2013 | Rennison | |
| 2001/0016828 A1 * | 8/2001 | Philippe et al. | 705/26 |
| 2002/0010909 A1 * | 1/2002 | Charisius et al. | 717/2 |
| 2002/0055954 A1 | 5/2002 | Breuer | 707/507 |
| 2002/0065814 A1 | 5/2002 | Okamoto et al. | 707/3 |
| 2002/0065815 A1 | 5/2002 | Layden | 707/3 |
| 2002/0128818 A1 | 9/2002 | Ho et al. | 704/9 |
| 2002/0154175 A1 | 10/2002 | Abello et al. | 345/853 |
| 2002/0173984 A1 | 11/2002 | Robertson et al. | 705/1 |
| 2003/0005036 A1 | 1/2003 | Mitzenmacher | 709/203 |
| 2003/0046288 A1 | 3/2003 | Severino et al. | |
| 2003/0069880 A1 | 4/2003 | Harrison et al. | 707/3 |
| 2003/0097357 A1 | 5/2003 | Ferrari et al. | 707/3 |
| 2003/0115485 A1 | 6/2003 | Milliken | 713/201 |
| 2003/0120373 A1 | 6/2003 | Eames | 700/128 |
| 2003/0120644 A1 | 6/2003 | Shirota | 707/3 |
| 2003/0120654 A1 | 6/2003 | Edlund et al. | 707/7 |
| 2003/0120659 A1 | 6/2003 | Sridhar | 707/100 |
| 2003/0154071 A1 | 8/2003 | Shreve | |
| 2003/0158855 A1 | 8/2003 | Farnham et al. | 707/102 |
| 2003/0182171 A1 * | 9/2003 | Vianello | 705/9 |
| 2003/0195872 A1 | 10/2003 | Senn | 707/3 |
| 2003/0208486 A1 * | 11/2003 | Dettinger et al. | 707/6 |
| 2003/0208665 A1 | 11/2003 | Peir et al. | 711/169 |
| 2003/0217052 A1 * | 11/2003 | Rubenczyk et al. | 707/3 |
| 2004/0015566 A1 * | 1/2004 | Anderson et al. | 709/219 |
| 2004/0030731 A1 | 2/2004 | Iftode et al. | 707/205 |
| 2004/0107125 A1 | 6/2004 | Guheen et al. | |
| 2004/0122844 A1 | 6/2004 | Malloy et al. | |
| 2004/0122846 A1 | 6/2004 | Chess et al. | |
| 2004/0123240 A1 | 6/2004 | Gerstl et al. | |
| 2004/0125137 A1 | 7/2004 | Stata et al. | 345/764 |
| 2004/0167909 A1 | 8/2004 | Wakefield et al. | 707/100 |
| 2004/0220904 A1 | 11/2004 | Finlay et al. | 707/3 |
| 2004/0236655 A1 | 11/2004 | Scumniotales et al. | 705/36 |
| 2004/0255237 A1 | 12/2004 | Tong | 715/501.1 |
| 2004/0260714 A1 | 12/2004 | Chatterjee et al. | |
| 2004/0267700 A1 | 12/2004 | Dumais et al. | 707/2 |
| 2005/0022009 A1 | 1/2005 | Aguilera et al. | 713/201 |
| 2005/0033803 A1 | 2/2005 | Vleet et al. | 709/203 |
| 2005/0039033 A1 | 2/2005 | Meyers et al. | 713/193 |
| 2005/0050016 A1 | 3/2005 | Stanoi et al. | 707/3 |
| 2005/0055327 A1 | 3/2005 | Agrawal et al. | 707/1 |
| 2005/0057566 A1 | 3/2005 | Githens et al. | 345/440 |
| 2005/0060277 A1 | 3/2005 | Zlatanov et al. | 707/1 |
| 2005/0076012 A1 | 4/2005 | Manber et al. | |
| 2005/0083413 A1 | 4/2005 | Reed et al. | 348/211.99 |
| 2005/0086222 A1 | 4/2005 | Wang et al. | |
| 2005/0086520 A1 | 4/2005 | Dharmapurikar et al. | 713/201 |
| 2005/0108630 A1 | 5/2005 | Wasson et al. | |
| 2005/0120004 A1 | 6/2005 | Stata et al. | 707/3 |
| 2005/0187898 A1 | 8/2005 | Chazelle et al. | 707/1 |
| 2005/0216464 A1 | 9/2005 | Toyama et al. | 707/9 |
| 2005/0217052 A1 * | 10/2005 | Baskerville | 15/250.19 |
| 2005/0219929 A1 | 10/2005 | Navas | 365/212 |
| 2005/0256825 A1 | 11/2005 | Dettinger et al. | |
| 2005/0268212 A1 | 12/2005 | Dagel | 715/500 |
| 2006/0004851 A1 | 1/2006 | Gold et al. | 707/103 X |
| 2006/0020582 A1 * | 1/2006 | Dettinger et al. | 707/3 |
| 2006/0047838 A1 | 3/2006 | Chauhan | |
| 2006/0053175 A1 | 3/2006 | Gardner et al. | |
| 2006/0064429 A1 * | 3/2006 | Yao | 707/101 |
| 2006/0085386 A1 | 4/2006 | Thanu et al. | 707/2 |
| 2006/0085465 A1 | 4/2006 | Nori et al. | |
| 2006/0112110 A1 | 5/2006 | Maymir-Ducharme et al. | |
| 2006/0136585 A1 * | 6/2006 | Mayfield et al. | 709/224 |
| 2006/0149700 A1 | 7/2006 | Gladish et al. | 707/1 |
| 2006/0173824 A1 | 8/2006 | Bensky et al. | 707/3 |
| 2006/0206508 A1 | 9/2006 | Colace et al. | 707/100 |
| 2006/0224582 A1 | 10/2006 | Hogue | 707/6 |
| 2006/0248456 A1 | 11/2006 | Bender et al. | |
| 2006/0253491 A1 | 11/2006 | Gokturk et al. | 707/104.1 |
| 2007/0022085 A1 * | 1/2007 | Kulkarni | 707/1 |
| 2007/0055656 A1 | 3/2007 | Tunstall-Pedoe | 707/3 |
| 2007/0067108 A1 | 3/2007 | Buhler et al. | 702/19 |
| 2007/0073663 A1 * | 3/2007 | McVeigh et al. | 707/3 |
| 2007/0143353 A1 * | 6/2007 | Chen | 707/200 |
| 2007/0179965 A1 | 8/2007 | Hogue et al. | 707/102 |
| 2007/0203867 A1 | 8/2007 | Hogue et al. | |
| 2007/0203868 A1 | 8/2007 | Betz | 706/50 |
| 2007/0271249 A1 | 11/2007 | Cragun et al. | 707/3 |
| 2008/0005064 A1 | 1/2008 | Sarukkai | 707/3 |
| 2008/0097958 A1 | 4/2008 | Ntoulas et al. | 707/2 |
| 2008/0104019 A1 | 5/2008 | Nath | |
| 2008/0209444 A1 | 8/2008 | Garrett et al. | 719/320 |
| 2008/0267504 A1 | 10/2008 | Schloter et al. | 382/181 |
| 2009/0100048 A1 | 4/2009 | Hull et al. | 707/5 |
| 2012/0036145 A1 | 2/2012 | Tunstall-Pedoe | |

FOREIGN PATENT DOCUMENTS

| | | | | |
|---|---|---|---|---|
| JP | 2002-157276 | 11/2000 | | |
| JP | 2002-540506 | 11/2002 | | |
| JP | 2003-281173 | 10/2003 | | |
| WO | WO 00/49526 A1 | 8/2000 | | G06F 17/30 |
| WO | WO 2004/114163 A2 | 12/2004 | | G06F 17/30 |
| WO | WO 2008/097051 A1 | 8/2008 | | G06F 17/30 |

OTHER PUBLICATIONS

Peter Anick, Using Terminological Feedback for web search Refinement—A Log-based Study—ACM 2003.*

PCT International Search Report and Written Opinion, PCT/US07/61156, Feb. 11, 2008, 7 pages.

(56) References Cited

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.
Freitag, D. et al., "Boosted Wrapper Induction," American Association for Artificial Intelligence, 2000, 7 pages.
Guha, R. et al., "Disambiguating People in Search," WWW2004, ACM, May 17-22, 2004, 9 pages.
Guha, R., "Object Co-identification on the Semantic Web," WWW2004, ACM, May 17-22, 2004, 9 pages.
Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.
"Information Entropy—Wikipedia, the free encyclopedia," [online] [Retrieved on May 3, 2006] Retrieved from the Internet<URL:http://en.wikipedia.org/wiki/Information_entropy>.
"Information Theory—Wikipedia, the free encyclopedia," [online] [Retrieved on May 3, 2006] Retrieved from the Internet<URL:http://en.wikipedia.org/wiki/Information_theory>.
Jones, R. et al., "Bootstrapping for Text Learning Tasks," 12 pages.
Kosseim, L, et al., "Answer Formulation for Question-Answering," 11 pages.
Liu, B. et al., "Mining Data Records in Web Pages," Conference '00, ACM, 2000, pp. 1-10.
McCallum, A. et al.; "Object Consolodation by Graph Partitioning with a Conditionally-Trained Distance Metric," SIGKDD '03, ACM, Aug. 24-27, 2003, 6 pages.
Mihalcea, R. et al., "PageRank on Semantic Networks, with Application to Word Sense Disambiguation," 7 pages.
Mihalcea, R. et al., "TextRank: Bringing Order into Texts," 8 pages.
PCT International Search Report and Written Opinion, PCT/US06/07639, Sep. 13, 2006, 6 pages.
Prager, J. et al., "IBM's PIQUANT in TREC2003," 10 pages.
Prager, J. et al., "Question Answering using Constraint Satisfaction: QA-by-Dossier-with-Constraints," 8 pages.
Ramakrishnan, G. et al., "Is Question Answering an Acquired Skill?", WWW2004, ACM, May 17, 2004, pp. 111-120.
Anagnostopoulos, I et al., "Information Fusion Meta-Search Interface for Precise Photo Acquisition on the Web," 25th International Conference on Information Technology Interfaces, ITI 2003, Jun. 16-19, 2003, Cavtat, Croatia, pp. 375-381.
Bharat, *Personalized, Interactive News on the Web,* Georgia Institute of Technology, Atlanta, GA, May 5, 1997, pp. 1-22.
Bloom filter, Wikipedia, en.wikipedia.org/wiki/Bloom_filter (last modified Feb. 13, 2005), pp. 1-4.
Bloom, *Space/Time Trade-offs in Hash Coding with Allowable Errors,* Communications of the ACM, vol. 13, No. 7, Jul. 1970, pp. 422-426.
Brin, *The Anatomy of a Large-Scale Hypertextual Web Search Engine,* 7th International World Wide Web Conference, Brisbane, Australia, Apr. 14-18, 1998, pp. 1-26.
Cao, *Bloom Filters—the math,* www.cs.wisc.edu/~cao/papers/summary-cache/node8.html, Jul. 5, 1998, pp. 1-6.
Chesnais, *The Fishwrap Personalized News System,* Community Networking, Integrated Multimedia Services to the Home, Proceedings of the Second International Workshop on, Jun. 20-22, 1995, pp. 275-282.
Clarke, *FrontPage 2002 Tutorials—Adding Functionality to your Website with FrontPage 2002 Part II—Navigation,* ABC—All 'Bout Computers, Apr. 2002, vol. 11, accessfp.net/fronpagenavigation.htm, 8 pages.
Cowie, *MOQA: Meaning-Oriented Question Answering,* Proceedings of RIAO 2004, 15 pages.
Ilyas, Rank-Aware Query Optimization, ACM SIGMOD 2004, Paris, France, Jun. 13-18, 2004, 12 pages.
International Search Report/Written Opinion, PCT/US07/061157, Feb. 15, 2008, 10 pages.
International Search Report/Written Opinion, PCT/US2006/010965, Jul. 5, 2006, 9 pages.
International Search Report/Written Opinion, PCT/US2007/061158, Feb. 28, 2008, 7 pages.
International Search Report and Written Opinion for PCT/US2010/044604 dated Oct. 6, 2010.
Kamba, *The Krakatoa Chronicle, An interactive, Personalized, Newspaper on the Web,* w3.ord/conferences/www4/papers/93, 1993, pp. 1-12.
Lin, *Question Answering from the Web Using Knowledge Annotation and Knowledge Mining Techniques,* CIKM'03, New Orleans, LA, Nov. 3-8, 2003, pp. 116-123.
Nyberg, *The Javelin Question-Answering System at TREC2003: A Multi Strategy Approach With Dynamic Planning,* TREC2003, Nov. 18-21, 2003, 9 pages.
Ogden, *Improving Cross-Language Text Retrieval with Human Interactions,* Proc. of the 33rd Hawaii International Conference on System Sciences, IEEE 2000, pp. 1-9.
*The MathWorks, Using Matlab Graphics,* Version 5, MathWorks, Natick, MA, Dec. 1996.
Thompson, *Freshman Publishing Experiment Offers Made-to-Order Newspapers,* MIT News Office, http://web.mit.edu/newsoffice/1994/newspaper-0309.html, 1994, pp. 1-4.
Anonymous, *Wie erstelle ich bei StudiVZ eine Bilder-Verlinkung? (How do I create an image with StudiVZ-linking?),* www.limillimil.de/wie-erstelle-ich-bei-studivz-eine-bilder-verlinkung-758.html, 2008, 10 pages.
Castro, *iPhoto's new Faces feature really does work!,*www.pigsgourdandwikis.com/2009/02/iphotos-new-faces-geature-really-does.html, Feb. 17, 2009, 8 pages.
International Search Report/Written Opinion, PCT/US2010/044603, Nov. 17, 2010, 11 pages.
Hogue, Office Action, U.S. Appl. No. 11/097,676, Jun. 28, 2007, 12 pgs.
Hogue, Office Action, U.S. Appl. No. 11/097,676, Dec. 31, 2007, 13 pgs.
Hogue, Office Action, U.S. Appl. No. 11/341,907, Jan. 8, 2008, 13 pgs.
Hogue, Office Action, U.S. Appl. No. 11/341,907, Dec. 17, 2009, 22 pgs.
Hogue, Office Action, U.S. Appl. No. 11/341,907, Jul. 24, 2009, 17 pgs.
Hogue, Office Action, U.S. Appl. No. 11/341,907, Nov. 24, 2008, 14 pgs.
Hogue, Office Action, U.S. Appl. No. 11/341,907, Jul. 27, 2010, 21 pgs.
Hogue, Office Action, U.S. Appl. No. 11/341,907, Jul. 31, 2008, 17 pgs.
Hogue, Office Action, U.S. Appl. No. 11/342,277, Dec. 8, 2008, 23 pgs.
Hogue, Office Action, U.S. Appl. No. 11/342,277, Dec. 16, 2009, 25 pgs.
Hogue, Office Action, U.S. Appl. No. 11/342,277, Aug. 18, 2008, 26 pgs.
Hogue, Office Action, U.S. Appl. No. 11/342,277, Jan. 22, 2008, 21 pgs.
Hogue, Office Action, U.S. Appl. No. 11/342,277, Jul. 26, 2010, 26 pgs.
Hogue, Office Action, U.S. Appl. No. 11/342,277, Jul. 27, 2009, 21 pgs.
Hogue, Office Action, U.S. Appl. No. 11/342,290, Aug. 7, 2008, 39 pgs.

(56) References Cited

OTHER PUBLICATIONS

Hogue, Office Action, U.S. Appl. No. 11/342,290, Jan. 24, 2008, 36 pgs.
Hogue, Office Action, U.S. Appl. No. 11/342,293, Apr. 3, 2009, 13 pgs.
Hogue, Office Action, U.S. Appl. No. 11/342,293, Jan. 18, 2008, 13 pgs.
Hogue, Office Action, U.S. Appl. No. 11/342,293, Jun. 18, 2010, 22 pgs.
Hogue, Office Action, U.S. Appl. No. 11/342,293, May 20, 2008, 18 pgs.
Hogue, Office Action, U.S. Appl. No. 11/342,293, Oct. 21, 2009, 15 pgs.
Hogue, Office Action, U.S. Appl. No. 11/342,293, Sep. 29, 2008, 14 pgs.
Hogue, Office Action, U.S. Appl. No. 11/356,851, Apr. 1, 2009, 9 pgs.
Hogue, Office Action, U.S. Appl. No. 11/356,851, Apr. 7, 2008, 15 pgs.
Hogue, Office Action, U.S. Appl. No. 11/356,851, Nov. 12, 2009, 10 pgs.
Hogue, Office Action, U.S. Appl. No. 11/356,851, Oct. 16, 2008, 10 pgs.
Kehlenbeck, Office Action, U.S. Appl. No. 11/357,748, Sep. 11, 2007, 19 pgs.
Kehlenbeck, Office Action, U.S. Appl. No. 11/357,748, Jan. 23, 2007, 10 pgs.
Ritchford, Office Action, U.S. Appl. No. 11/356,728, Oct. 7, 2010, 54 pgs.
Ritchford, Office Action, U.S. Appl. No. 11/356,728, May 21, 2008, 25 pgs.
Ritchford, Office Action, U.S. Appl. No. 11/356,728, Nov. 26, 2008, 25 pgs.
Ritchford, Office Action, U.S. Appl. No. 11/356,728, May 27, 2009, 34 pgs.
Ritchford, Office Action, U.S. Appl. No. 11/356,728, Jan. 28, 2010, 50 pgs.
Ritchford, Office Action, U.S. Appl. No. 13/292,017, Apr. 24, 2012, 9 pgs.
Ritchford, Office Action, U.S. Appl. No. 13/292,030, May 1, 2012, 11 pgs.
Rochelle, Office Action, U.S. Appl. No. 11/749,679, Oct. 8, 2010, 8 pgs.
Rochelle, Office Action, U.S. Appl. No. 11/749,679, Mar. 22, 2010, 8 pgs.
Vespe, Office Action, U.S. Appl. No. 11/535,843, Aug. 18, 2009, 16 pgs.
Vespe, Office Action, U.S. Appl. No. 11/535,843, Dec. 23, 2008, 15 pgs.
Zhao, Office Action, U.S. Appl. No. 11/536,504, Aug. 14, 2008, 19 pgs.
Zhao, Office Action, U.S. Appl. No. 11/536,504, Feb. 23, 2009, 19 pgs.
Ritchford, Office Action, U.S. Appl. No. 13/292,030, Jan. 4, 2013, 15 pgs.
Google, Office Action, CA 2,610,208, Sep. 21, 2011, 3 pgs.
Google, Office Action, JP 2008-504204, Oct. 12, 2011, 4 pgs.
Ritchford, Office Action, U.S. Appl. No. 13/292,017, Feb. 1, 2013, 15 pgs.
Ritchford, Final Office Action, U.S. Appl. No. 13/292,017, Oct. 25, 2013, 17 pgs.
Hogue, Decision on Appeal, U.S. Appl. No. 11/342,277, Jan. 24, 2014, 7 pgs.
Ritchford, Office Action, U.S. Appl. No. 13/292,030, Jan. 6, 2014, 16 pgs.
Zhao, Decision on Appeal, U.S. Appl. No. 11/536,504, Nov. 21, 2013, 8 pgs.
Zhao, Notice of Allowance, U.S. Appl. No. 11/536,504, Feb. 6, 2014, 16 pgs.
Ritchford, Office Action, U.S. Appl. No. 13/292,017, Jun. 16, 2014, 15 pgs.
Zhao, Notice of Allowance, U.S. Appl. No. 11/536,504, Jun. 4, 2014, 17 pgs.
Ritchford, Final Office Action, U.S. Appl. No. 13/292,030, Apr. 25, 2014, 16 pgs.

* cited by examiner

Example Format of Facts in Repository (each fact is associated with an object ID)

Example Facts in Repository (each
fact is associated with an object ID)

| Object ID=1 | Fact ID=10 |
| Object ID=1 | Fact ID=20 |
| Object ID=1 | Fact ID=30 |
| Object ID=2 | Fact ID=40 |

⋮

FIG. 2(c)
Example Object
Reference Table

Example Format of Facts in Repository (each fact is associated with an object ID)

Example Objects

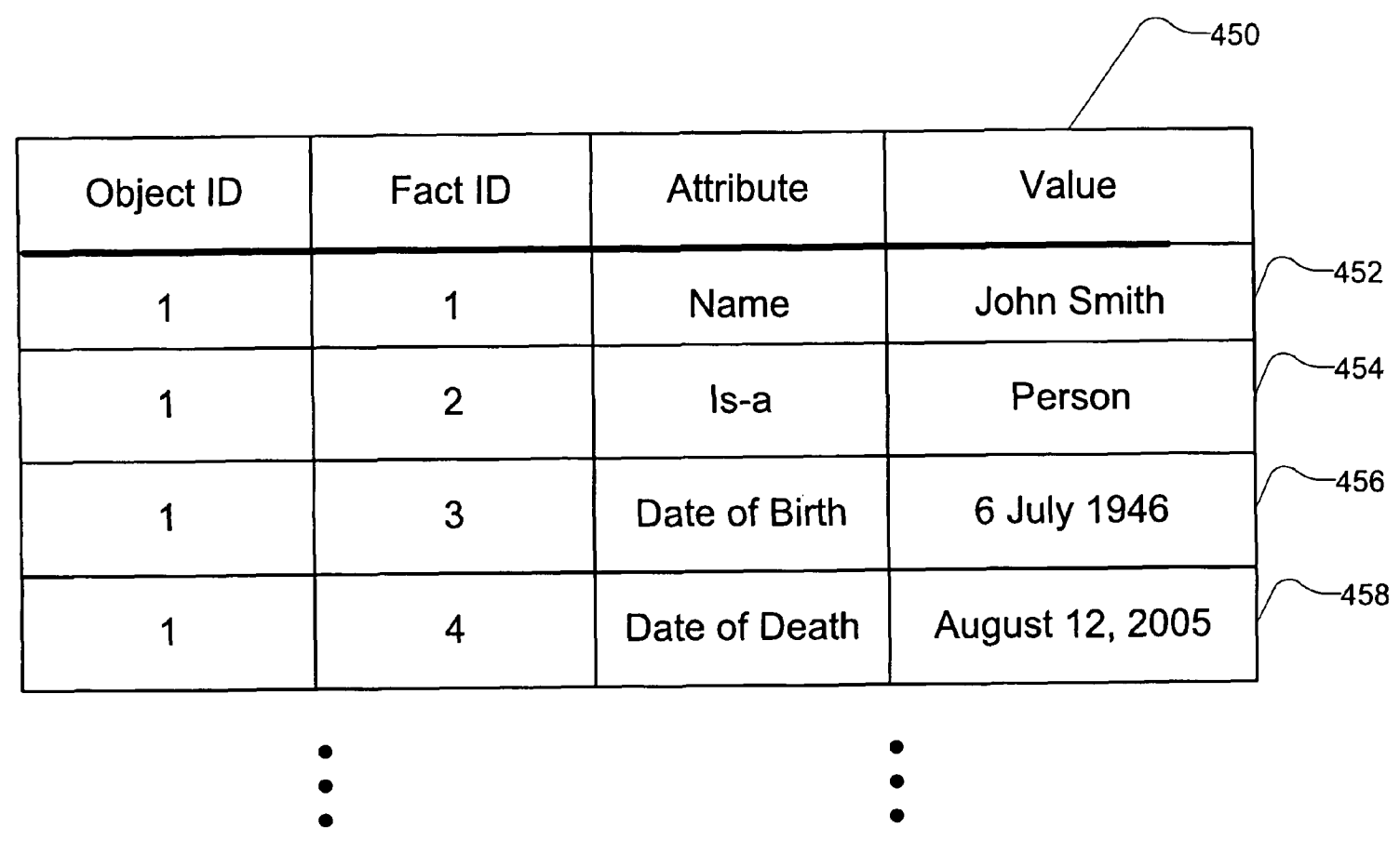

| Object ID | Fact ID | Attribute | Value |
|---|---|---|---|
| 1 | 1 | Name | John Smith |
| 1 | 2 | Is-a | Person |
| 1 | 3 | Date of Birth | 6 July 1946 |
| 1 | 4 | Date of Death | August 12, 2005 |

Fig. 4

QUERY LANGUAGE

CROSS-REFERENCE TO RELATED APPLICATIONS

This application is related to the following U.S. Applications, all of which are incorporated by reference herein:

U.S. application Ser. No. 11/357,748, entitled "Support for Object Search", filed on Feb. 17, 2006, by Alex Kehlenbeck, Andrew W. Hogue, Jonathan T. Betz;

U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,837, entitled "Automatic Object Reference Identification and Linking in a Browseable Fact Repository", filed on Feb. 17, 2006, by Andrew W. Hogue;

U.S. application Ser. No. 11/356,851, entitled "Browseable Fact Repository", filed on Feb. 17, 2006, by Andrew W. Hogue, Jonathan T. Betz;

U.S. application Ser. No. 11/356,842, entitled "ID Persistence Through Normalization", filed on Feb. 17, 2006, by Jonathan T. Betz, Andrew W. Hogue;

U.S. application Ser. No. 11/356,728, entitled "Annotation Framework", filed on Feb. 17, 2006, by Tom Richford, Jonathan T. Betz;

U.S. application Ser. No. 11/341,069, entitled "Object Categorization for Information Extraction", filed on Jan. 27, 2006, by Jonathan T. Betz;

U.S. application Ser. No. 11/356,838, entitled "Modular Architecture for Entity Normalization", filed on Feb. 17, 2006, by Jonathan T. Betz, Farhan Shamsi;

U.S. application Ser. No. 11/356,765, entitled "Attribute Entropy as a Signal in Object Normalization", filed on Feb. 17, 2006, by Jonathan T. Betz, Vivek Menezes;

U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert.

BACKGROUND OF THE INVENTION

1. Field of the Invention

This invention pertains in general to searching collections of data and, in particular, to ways of querying such collections of data.

2. Description of the Related Art

The World Wide Web and other information storage and retrieval systems contain a great deal of information. With the advent of search engines and other similar tools it has become relatively easy for an end-user to locate particular information. For example, one can obtain a wealth of information about "elemental particles" by simply searching for the terms "elemental particles" on the Web. This search can be accomplished using one or both of a graphical search engine or a text-based search engine.

Many search engines exist to search the World Wide Web. The Google search engine, for example, employs a user-friendly syntax that lets users simply type in a search query for items of interest (e.g., typing "Britney Spears" to find out information about the singer Britney Spears). The Google search engine also allows users to construct more complex search queries. For example, advanced Google search allows users to search for web pages by specifying that the web page: a) must contain an exact phrase (by placing the query terms in quotes); b) must contain one or more of the query terms, or c) must not contain one or more of the query terms. This advanced search capability allows a user to tailor his search for web pages that contain specific information. Google search permits search of web pages, which are an example of unstructured data.

Many search engines also exist to search more conventional databases of structured data. For example, the SQL query language allows users to search more conventional structured databases. Such databases usually have data stored in predefined formats and in predefined fields. Thus, an SQL query looks for certain values in predefined fields.

As the retrieval and storage of information on the Internet continues to evolve, information is being stored in many different formats besides web pages. What is needed are new and advanced ways of searching large collections of data from diverse sources, such as the Internet.

BRIEF SUMMARY OF THE INVENTION

The described embodiments of the present invention provide a methodology and system for searching facts in a collection of semi-structured data called a fact repository. The fact repository includes a large collection of facts, each of which is associated with an object, such as a person, place, book, movie, country, or any other entity of interest. Each fact comprises an attribute, which is descriptive of the type of fact (e.g., "name," or "population"), and a value for that attribute (e.g., "George Washington", or "1,397,264,580"). A value can also contain any amount of text—from a single term or phrase to many paragraphs or pages—such as appropriate to describe the attribute. Each object will have a name fact that is the name of the object. The value of a value can thus include one or more phrases that are themselves the names of other facts.

The embodiments of the present invention incorporate a query language to search semi-structured data. Although the data is organized into fields including attributes, the user may not know all possible attribute names/types, etc. Because the user is searching semi-structured data (instead of structured data) the user can submit a query even when he does not know what attributes are contained in the repository. Because the user is searching semi-structured data (instead of unstructured data) the user can submit a query over data that has been organized to a certain extent.

The present invention further has embodiments in computer program products, computer systems, and computer user interfaces, which perform or cooperate in the operation or use of the foregoing method (or its alternative embodiments and features).

BRIEF DESCRIPTION OF THE DRAWINGS

FIGS. 2(a)-2(d) are block diagrams illustrating a data structure for facts within a repository of FIG. 1 in accordance with preferred embodiments of the invention.

FIG. 4 shows an example of a plurality of facts in a repository of FIG. 1.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
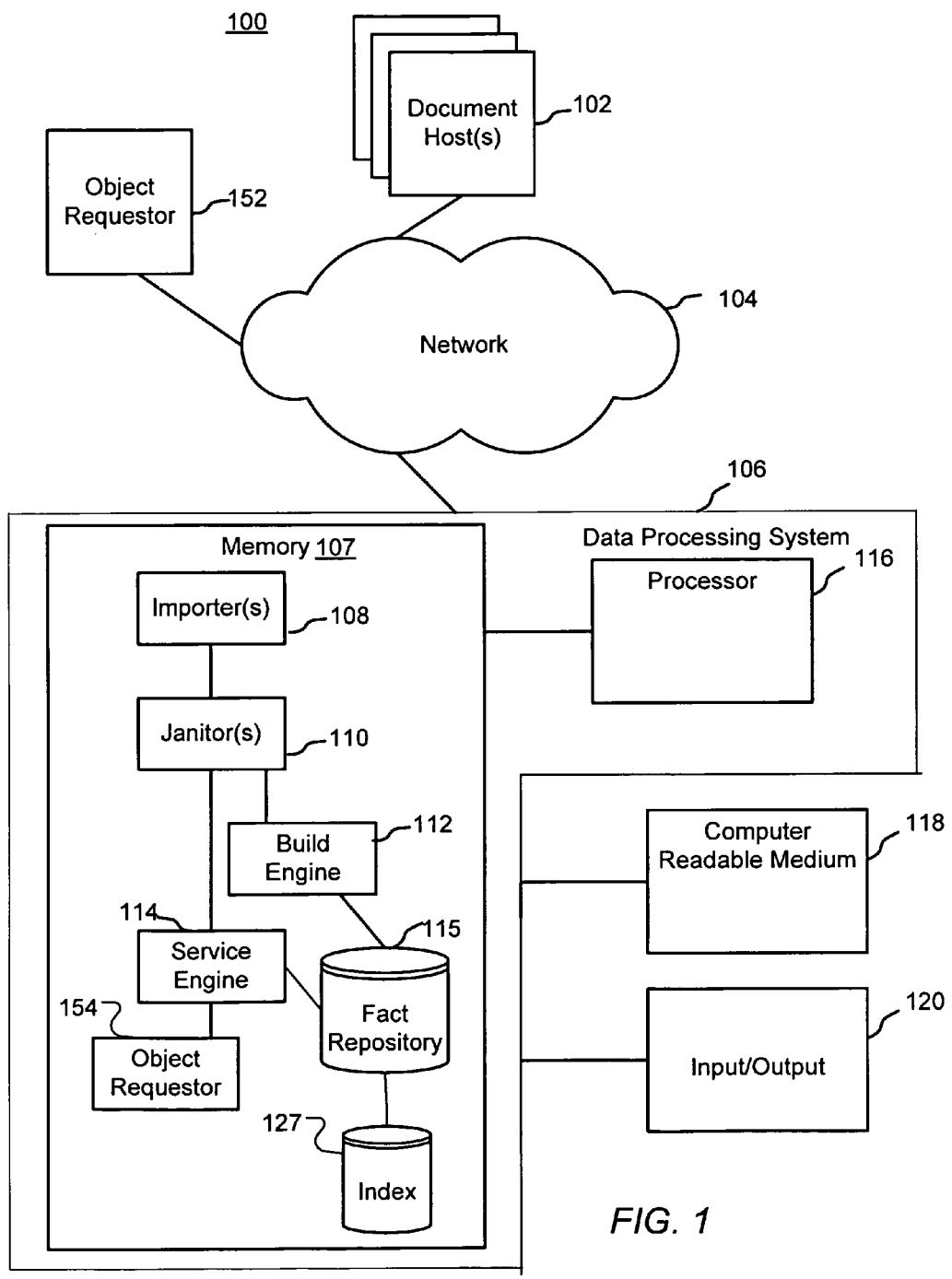
FIG. 1 shows a system architecture, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
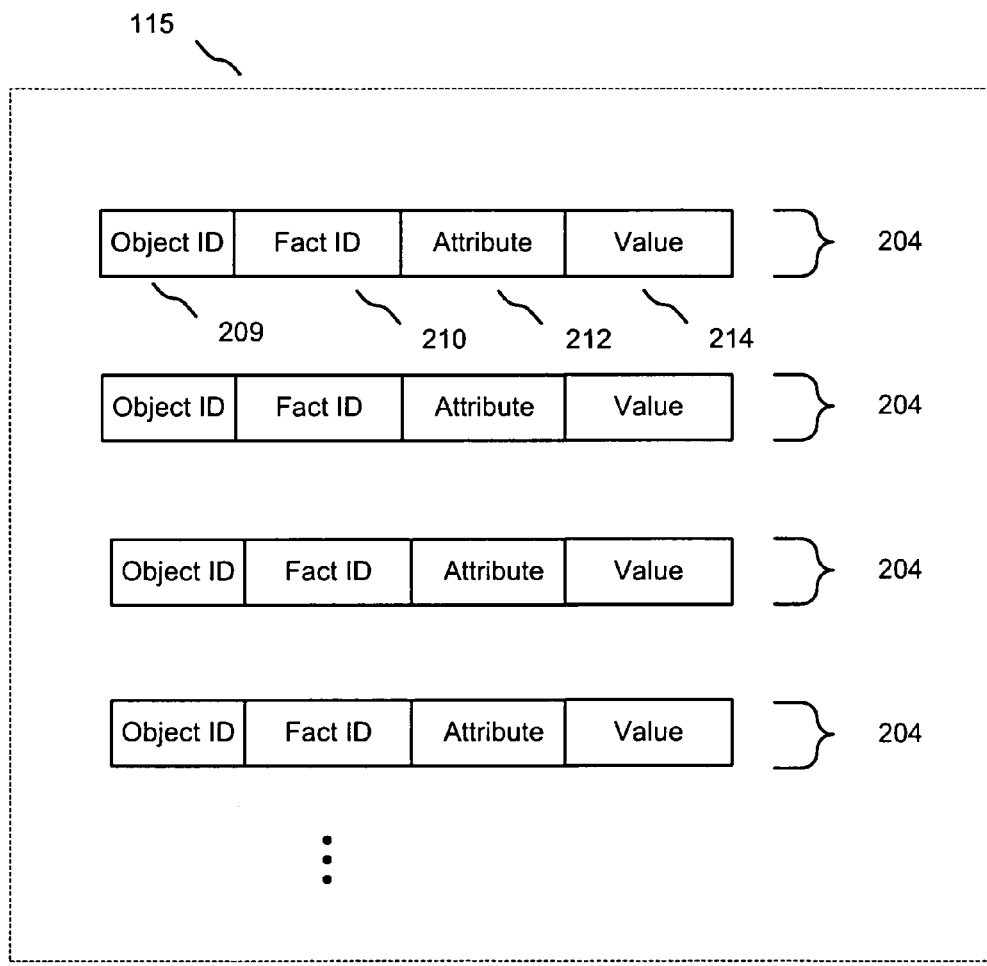

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
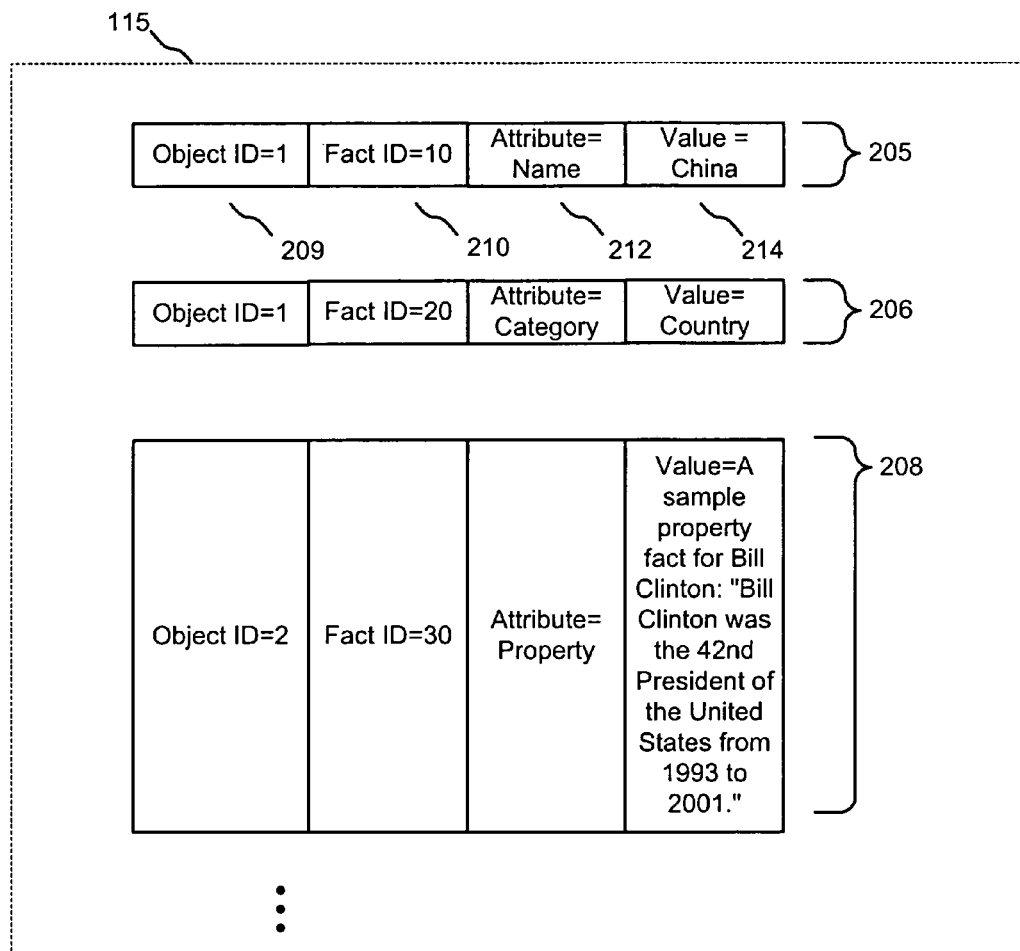

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
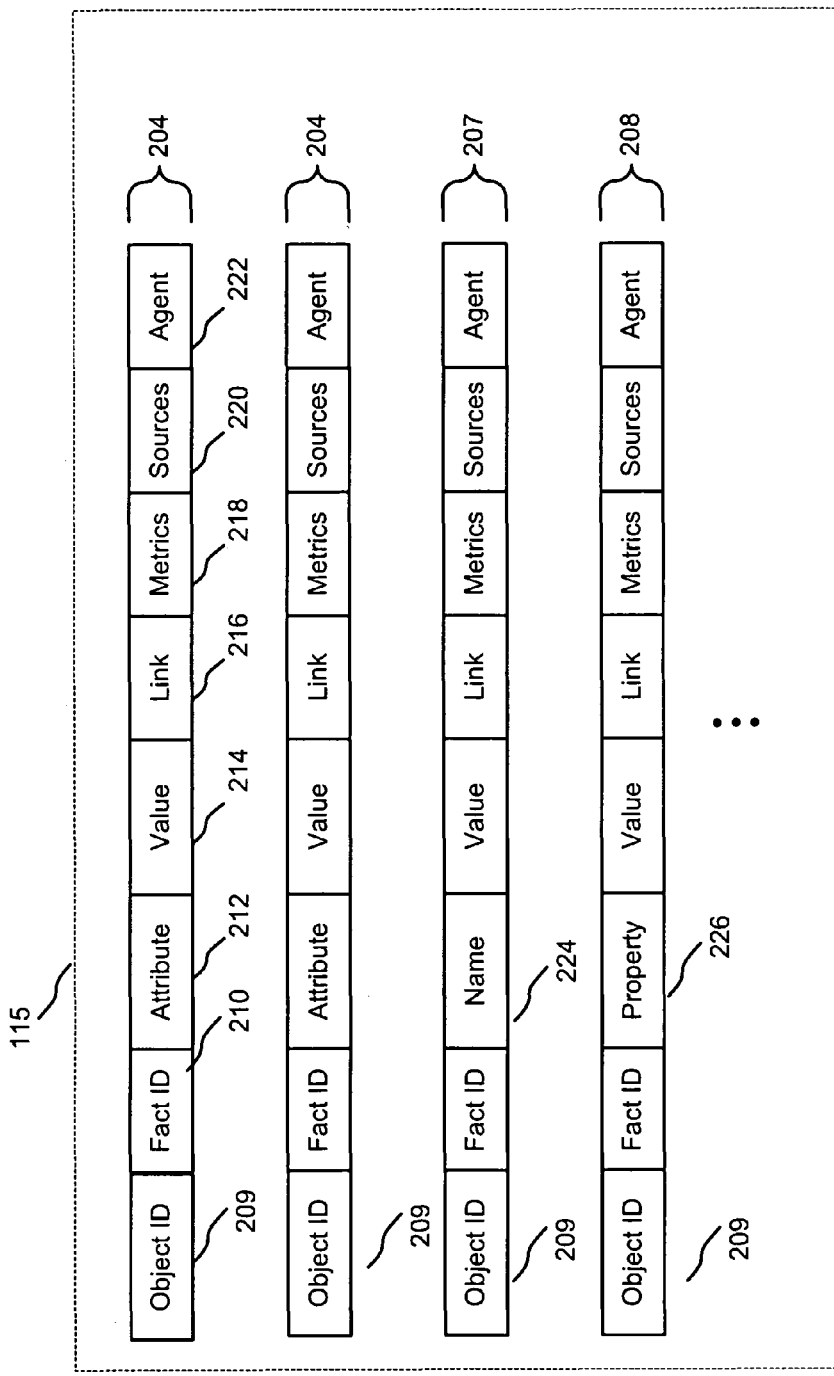
Figure 2E:
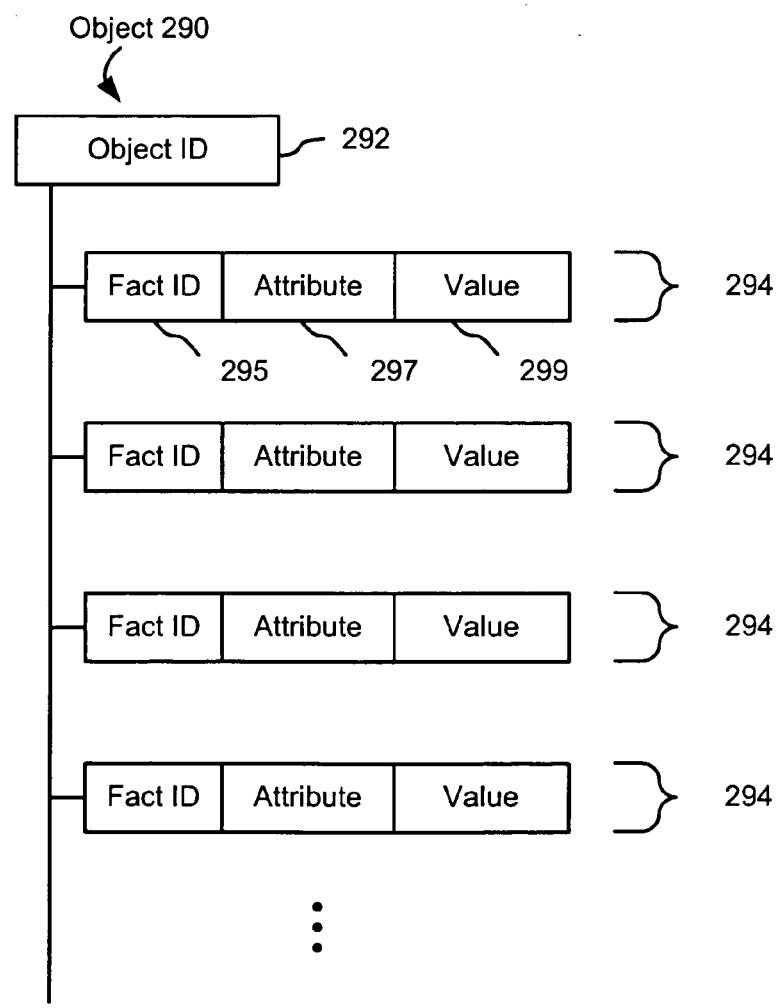
FIG. 2(e) is a block diagram illustrating an alternate data structure for facts and objects in accordance with preferred embodiments of the invention.

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush"

object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(*d*) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001.'" Some object IDs may have one or more associated property facts while other objects may have no associated property facts. It should be appreciated that the data structures shown in FIGS. 2(*a*)-2(*d*) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

FIG. 2(*e*) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Referring again to FIG. 1, the content of the facts in the repository 115 are also indexed in index 127. The index 127 maintains a term index, which maps terms to {object, fact, field, token} tuples, where "field" is, e.g., attribute or value. The service engine 114 is adapted to receive keyword queries from clients such as object requestors, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results.

In one embodiment the ranking (score) of an object is a linear combination of relevance scores for each of the facts. The relevance score for each fact is based on whether the fact includes one or more query terms (a hit) in, for example, one of the attribute, value, or source portion of the fact. Each hit is scored based on the frequency of the term that is hit, with more common terms getting lower scores, and rarer terms getting higher scores (e.g., using a TF-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts is selected for display in response to a query.

A user interface for browsing the fact repository 115 is discussed in co-pending U.S. application Ser. No. 11/356, 851, entitled "Browseable Fact Repository" of Betz and Hogue, which is herein incorporated by reference.

Figure 3A:
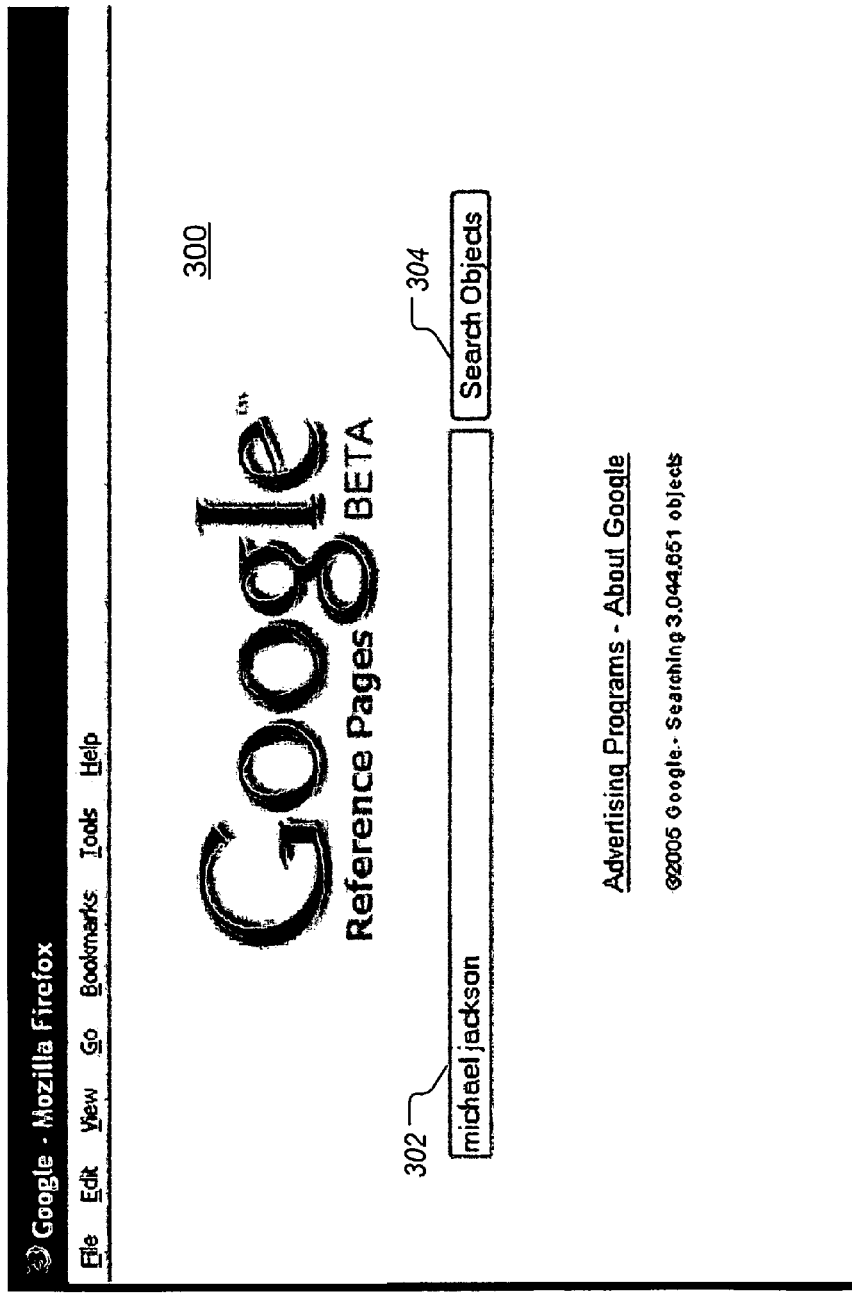
FIG. 3(a) illustrates a landing page for initiating a search query of a fact repository
Figure 3B:
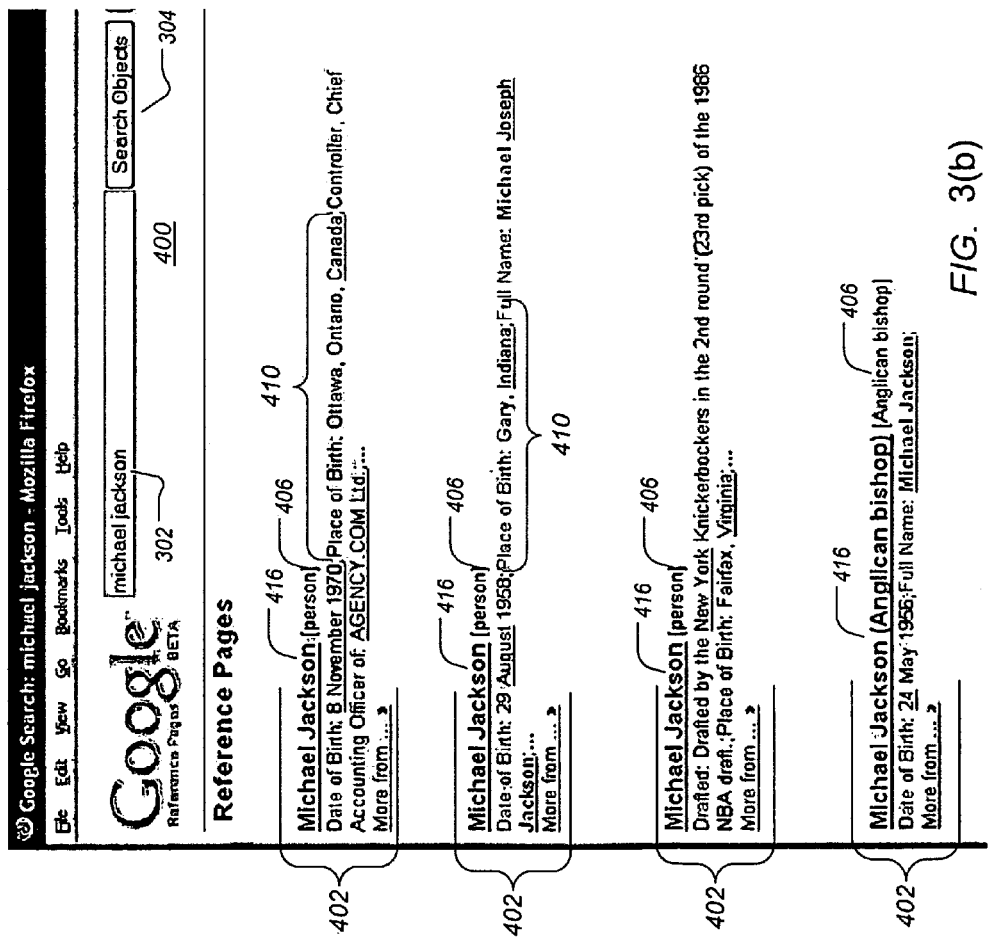
FIG. 3(b) illustrates a search results page.

Referring now to FIGS. 3(a) and 3(b), there are shown various examples from a user interface for querying the fact repository 115 in accordance with one embodiment of the present invention. In FIG. 3(a) there is shown a simple landing or home page for initiating a query of the fact repository 115. The page 300 includes a search query field 302 and a search objects button 304. The user enters any number of query terms into the search field 302 as described below. The terms can be any terms whatsoever, as they may appear in any fact. The user selects the search objects button 304 to provide the query terms to the service engine 114.

FIG. 3(b) illustrates the search result page 400 of a search, here for the search query "Michael Jackson." The results page 400 includes a list of ranked search results 402, each search result 402 comprising a name link 416 to an object, the anchor text of the link 416 being the name of the object (the name link 416 resolves to an object detail page, as further described below). The results 402 are ranked according to their relevance to the search query. Each search result 402 (which for the purpose of this discussion can also be referred to as an object) is displayed with a label 406 indicating the category of the object (e.g., country, company, person, car, etc.).

Next to each search result 402 is displayed one example of an object search link 408. When selected, the object search link 408 causes a search query to be sent from the client device to the service engine. This search query is for objects of the same category as the search result object, and which contain the current search query terms in at least one of the facts associated with such object. For example, in response to the user clicking on the search link 406, a search query is sent to the service engine 127 for objects of category "country" and which contain the query term "china" in one or more facts. Thus, the object search link operates to further filter out the search results, such as the second and third search results 402 which are companies, and not countries.

Details of Query Language

As described above, queries to the repository 115 generally return objects. Which objects are returned is decided by search engine 123 in accordance with which facts match a query. For example, a query might be received from a web-based search engine such as that shown in FIGS. 3(a) and 3(b). A query could also be received in other ways, such as a payload in an http request sent to the service engine 114 and then passed to the search engine 123, and through an API of a service engine such as service engine 114.

Other embodiments return individual facts matching the query, instead of returning objects that contain matching facts.

Figure 3C:
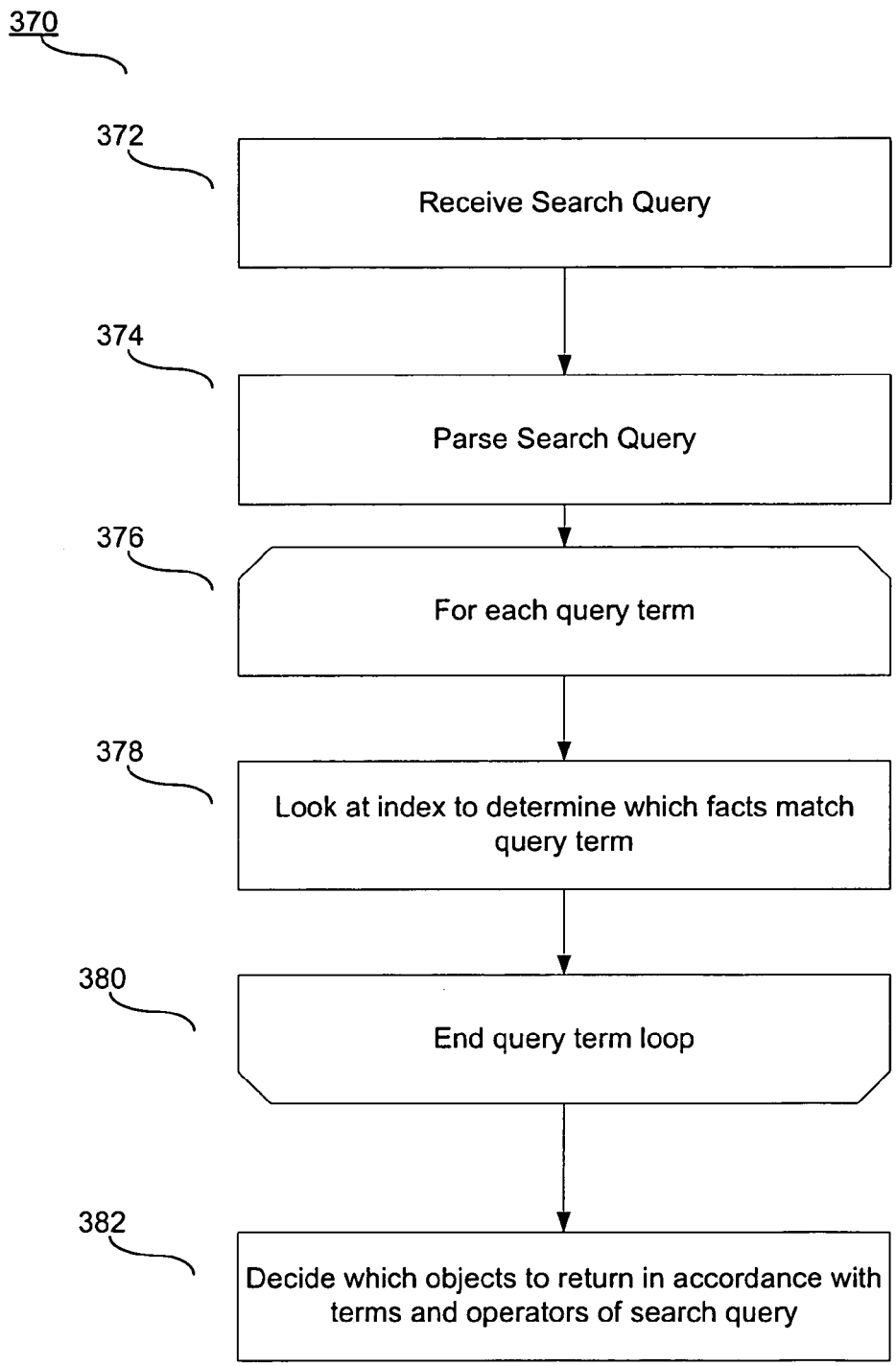
FIG. 3(c) is a flow chart of a method for processing a search query.

FIG. 3(c) shows a flow chart 370 of a method performed by service engine 114 to process a search query. The search query first is received 372 and parsed 374. Then, service engine 114 loops for each term in the search query (376-380). For each term in the search query, the reverse index 127 is checked to determine which facts contain the query term. Service engine 114 determines 382 whether to return an object by determining whether its facts meet the requirements of the search query. The service engine 114 is also adapted to handle structured queries, using query operators that restrict the scope of a term match. For example, a fact restriction operator, comprising brackets enclosing terms, e.g., "[terms]", restricts the term(s) to matching in a single fact. Field restriction operators attribute{ } and value{ } operators restrict to a single field.

A preferred embodiment of the present invention uses a query syntax as described below:

&|-( ): These are logical operators (respectively, AND, OR, NOT). If omitted, queries are assumed to have an implicit & operator. Parentheses are used to group terms and operators into logical groups. Note that the choice of characters used to indicate logical operators is merely an implementation choice. Any character or combination of characters can signal an operator.

" ": Double quotes surrounding a sequence of query terms require that the terms match in that order in a single field. This is called a phrase match.

^: If a caret immediately precedes a word, it may only match the first word of a field and if the caret immediately follow a word, it may match only the last word of a field. Quotes and carets can be combined to produce an exact field match, for example "^George W. Bush^". In one embodiment, carets may only occur within quotes. In other embodiments, carets can applied to any term.

[ ]: Square brackets restrict the enclosed expression to appear in the same fact.

{ } Curly brackets: restrict the enclosed expression to match a single field. This can be further restricted to a field of a specific type, such as attribute{ . . . } or value{ . . . }.

[X:Y]: Shortcut for [attribute{X} value{Y}]. Matches an attribute/value pair of a fact with the specified values.

FIG. 4 shows an example object 450 having ID#1 in fact repository 115. The object includes facts #1-4 (reference numbers 452, 454, 456, and 458). Fact #1 has an attribute of "Name" and a value of "John Smith." Fact #2 has an attribute of "is-a" and a value of "person." Fact #3 has an attribute of "Date of Birth" and a value of "6 Jul. 1946." Fact #4 has an attribute of "Date of Death" and a value of "Aug. 12, 2005." The following examples of query searches refer to the facts shown in FIG. 4.

The following paragraphs discuss examples of a query syntax that can be used to search repository 115. It will be understood that the Figures show examples of such a syntax and that other syntaxes could be used without departing from the spirit and scope of the present invention. Although the following examples show individual queries, it is also possible to refine a search with a further search, so that the initial search results are retained and searched again with additional queries that further refine the results. In one embodiment, the query terms are normalized before being applied. Such normalization might include removal of accents (diacritics), or stemming (removing of inflectional morphemes), or changing non-quoted terms to be all upper or all lower case.

Figure 5A:
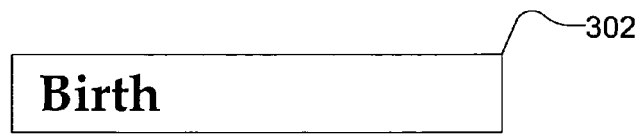
FIG. 5(a)-5(t) illustrate examples of search queries.

FIG. 5(a) shows the following query that is entered into search query field 302:

Birth

This search query will return all objects whose facts contain the specified query term "Birth". It is important to note that search queries performed by service engine 114 in accordance with the present invention look at both a fact's attribute (also called attribute name) and the fact's value (also called attribute value) to determine if the fact is relevant to the query.

For example, the search query of FIG. 5(a) will match fact #3 because fact #3 has "Birth" in its "Date of Birth" attribute. The search query will return object #1 because object #1 is associated with fact #3.

Other embodiments of the present invention look at other portions of facts in addition to or instead of attributes and values. For example, other embodiments may default to also searching for query terms within a fact's links 216, metrics 218, sources, 220 or agents 222 and so on (see FIG. 2(d)). Still other embodiments may implement a query syntax that allows a user to explicitly search within various fields of a fact (such as links 216, metrics 218, sources 220, or agents 222 and so on). For example, in such an embodiment, the search query birth matches a fact containing a link field 216 of www.birth.com but would not match www.birthday.com. In other embodiments, a query of birth would match www.birthday.com since "birth" is contained in "birthday.".

Figure 5B:

FIG. 5(b) shows the following query that is entered into search query field 302:

Birth August

In the described embodiment, a logical AND operator is implicit if no logical operator is specified for query terms. That is, an object must have associated facts matching both terms in order to be returned as a result of the query. This query will return all objects that have the term "Birth" and the term "August" in one or more of their facts. It is important to note that search queries performed in accordance with the present invention look at both a fact's attribute (also called attribute name) and the fact's value (also called attribute value) to determine if the fact is relevant to the query. For example, this search query will match fact #3 because fact #3 contains the term "Birth" (as an attribute). It will also match fact #4 because fact #4 contains "August" (as a value). Thus, this search query returns object #1 because object #1 is associated with matching facts #3 and #4.

Figure 5C:

FIG. 5(c) shows the following search query that is entered into search query field 302:

John &iIs-a

The ampersand (&) is an explicit logical operator that indicates that all search query terms must be present (although not necessarily in the same fact or in any particular field of the facts) for an object to match. This search query will return all objects with facts that contain both the term John" and the term "is-a". Here, the term "John" is in fact #1 and the term "is-a" is an attribute of fact #2, so object #1 would be returned since it is associated with facts containing both search query terms.

Thus, even though the original source documents on document hosts 102 that were used to create the facts of object #1 may not have contained the word "is-a," object #1 will be returned by the search query since at some point a fact with an attribute of is-a was added to the object. For example, a janitor whose function is categorizing objects might have created multiple new "is-a" facts having an attribute of "is-a" Thus, for example, a janitor 110 may exist that searches the fact repository 115 and categorizes objects, an creating new facts with an "is-a" attribute having a value of "person" "cat," "dog" and so on for each categorized object. It will be possible for a user to enter a search query to locate all objects that have been categorized by the janitor (by searching for the attribute "is-a"). It would also be possible for a user to enter a search query to locate all objects that have been categorized as persons (by searching for the attribute "is-a" and the value "person" as an attribute/value pair within a single fact, as discussed below).

Figure 5D:

FIG. 5(d) shows the following search query that is entered into search query field 302:

John|"human being"

Figure 5E:
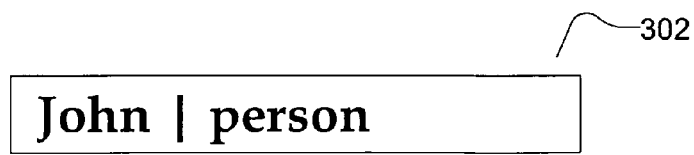

The vertical bar (|) is an explicit logical operator that indicates that only one query term much be present to match, although both may be present and still match. This search query will return all objects containing either the term "John" or the phrase "human being." Here, the term "John" is in fact #1. Even though the phrase "human being" is not found, object #1 would be returned since it is associated with fact #1, and therefore satisfies the Boolean disjunction. FIG. 5(e) shows the following search query that is entered into search query field 302:

John|person

This search query will return all objects containing either the term "John" or the term "person". Here, the term "John" is in fact #1 and the term "person" is an attribute of fact #2, so object #1 would be returned. Other embodiments may allow a user to perform an exclusive OR'd search (i.e., only one fact, not more or fewer must match).

Figure 5F:
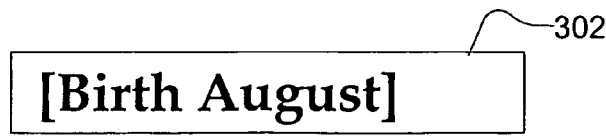

FIG. 5(f) shows the following search query that is entered into search query field 302:

[Birth August]

A search query using square brackets ([ ]) will return all objects where both query terms are in the same fact. Here, this search query will return nothing since no object in the example has a fact containing both "Birth" and "August." This is in contrast to the query Birth August of FIG. 5(b), which matched facts #3 and #4 and returned object #1. In one embodiment, logical operators can occur within square brackets. For example a query might contain: [(Birth August) |Birth]

Figure 5G:

In contrast, FIG. 5(g) shows the following search query that is entered into search query field 302:

[Birth Date]

This search query will return all objects where both query terms are in the same fact. The terms do not have to be an attribute/value pair in the fact. Here, this search query matches fact #3 since it has both terms (in its attribute name). Thus, this search query will return object #1 because it is associated with fact #3.

Figure 5H:

FIG. 5(h) shows the following search query that is entered into search query field 302:

[Birth:Date]

This search query will return all objects where the term on the left side of the ":" is an attribute name of a fact and the term on the right side of the ":" is an attribute value in the same fact. Here, there is no fact with an attribute containing the term "Birth" that also has a value containing the term "Date" so this search query does not match any facts in the example and no objects are returned." In one embodiment, the right hand side and/or left hand side of the colon do not have to be exact matches unless the "A" operator is used.

Figure 5I:

In contrast, if the following search query of FIG. 5(i) was entered into search query field 302:

[Date:July]

This search query matches object #3 because object #3 includes a fact with an attribute containing the term "Date" and a value in the same fact containing the term "July". Thus, object #1, which is associated with fact#3 would be returned. Note that the syntax with an attribute on the left and a value on the right with a colon between can use complex syntax, such as that specified below, on the right or the left side.

Figure 5J:

FIG. 5(j) shows the following search query that is entered into search query field 302:

{John Smith}

The matched pair of braces indicates that the terms within must match exactly in a single field. This search query will return all objects containing facts with the exact terms "John Smith". For example, this search query will match fact #1 and thus return object #1.

Figure 5K:
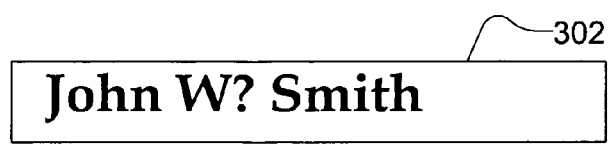

FIG. 5(k) shows the following search query that is entered into search query field 302:

John W? Smith

The question mark "?" indicates that the term preceding it is optional. Thus, this search query will return all objects having a fact containing "John Smith" or "John W Smith". In the example, it will match fact #1 and will return object #1.

Figure 5L:
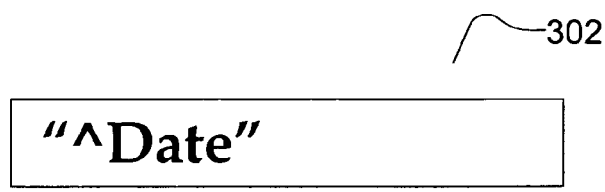

FIG. 5(l) shows the following search query that is entered into search query field 302:

"^Date"

The caret "^" before a term indicates that the term must occur at the beginning of a field. Thus, this search query will return all objects having a fact containing the term "Date" at the beginning of a field (e.g., at the beginning of an attribute or a value). In the example, it will match facts #3 and #4 and will return object #1. Some embodiments allow the caret to occur only in a quoted string. Other embodiments allow the caret to be used without quotes.

Figure 5M:

FIG. 5(m) shows the following search query that is entered into search query field 302:

"Date^"

The caret "^" after a term indicates that the term must occur at the end of a field. Thus, this search query will return all objects having a fact containing the term "Date" at the end of a field (e.g., at the end of an attribute or a value). In the example, it will not match any facts and will return no objects.

Figure 5N:
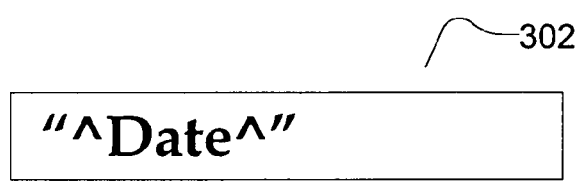

FIG. 5(n) shows the following search query that is entered into search query field 302:

"^Date^"

The caret "^" before and after a term indicates that this query would match any field that consists of only the term "date". Thus, this search query will return all objects having a fact containing the term "Date" (e.g., in an attribute or a value). With no characters preceding of following "date". In the example, the search query will not match any facts and will return no objects. If, for example, a fact contained an attribute of the term "date" then that fact would match and its associated object would be returned.

Figure 5O:

FIG. 5(o) shows the following search query that is entered into search query field 302:

Attribute{Date} Value{August}

This search query allows the user to specify that the character string "Date" must be in an attribute and the character string "August" must be in a value. In the example, the search query will match facts #3 and #4 and will return object #1. The following paragraphs provide examples to illustrate the logical not operator (minus), which has complex interactions with the scoping operators [ ] and { }.

Figure 5P:
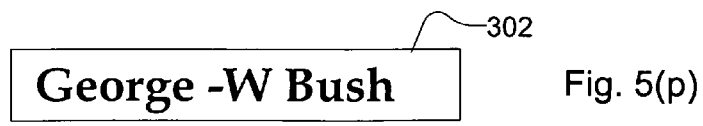

FIG. 5(p) shows a query:

George-W Bush

This query matches an object that contains one or more facts with "George" and one or more facts with "Bush", but no facts with "W".

Figure 5Q:

FIG. 5(q) shows a query:

[George-W Bush]

This query matches any object with a fact that contains "George" and "Bush", but not "W".

Figure 5R:
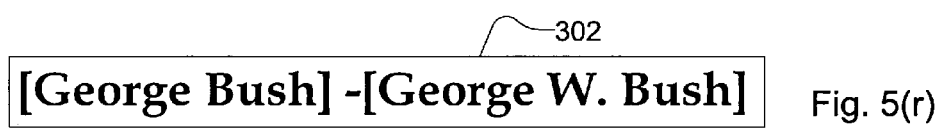

FIG. 5(r) shows a query:

[George Bush]-[George W. Bush]

This query matches any object with a fact containing "George" and "Bush", but not an object with a fact containing "George W. Bush".

Figure 5S:
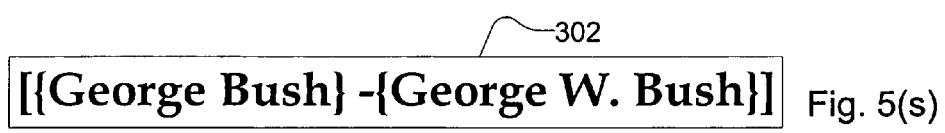

FIG. 5(s) shows a query:

[{George Bush}-{George W. Bush}]

This query matches an object with a fact that has a field containing "George Bush", but no field containing "George W. Bush".

Figure 5T:

FIG. 5(t) shows a query:

{George Bush-"George Bush"}

This query matches a field with the terms "george" and "bush", but not in that order.

The above embodiment specified syntax requiring the query terms to be in the same fact. Other embodiments implement query syntax that requires the query terms to be in different facts. For example, in another embodiment, a search query containing angle brackets: <A B> might require that the terms "A" and "B" be present but be located in different facts. Other embodiments implement query syntax that requires one query term to be in an attribute and one query term to be in a value, but does not specify which is which.

The query of FIG. 5(b) defaults to not requiring the terms to be located in the same fact and require explicitly specifying when the terms must be in the same fact. In contrast, other embodiments default to requiring the terms to be located in the same fact and include syntax to force the terms to be located in different facts. In such an embodiment, Birth August requires that the terms "Birth" and "August" default to a requirement that they must be in the same fact while the search query [Birth August] requires that the terms are not in the same fact. The meaning (semantics) of the syntax in this example is exactly the opposite of the meaning of the syntax of FIGS. 5(a) and 5(f) and is presented herein to emphasize that the exact syntax used to send queries may differ in different embodiments of the present invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of searching a fact repository, the method comprising:
    at a computer system including one or more processors and memory storing one or more programs, the one or more processors executing the one or more programs to perform the operations of:
    receiving at the fact repository a search query provided by a user from a single generic search query box of a web based search engine configured to perform both web search queries in web documents and fact repository queries in the fact repository, the query including a restriction operator and a plurality of search terms, wherein the restriction operator is selected from a group consisting of: a fact restriction operator that causes a single fact to be searched for the search terms, wherein the plurality of search terms need not all appear in a single field, and a field restriction operator that causes any single unspecified field of a fact to be searched for all of the search terms, wherein the fact repository includes objects and facts extracted from unstructured documents or web pages, wherein each of the objects represents an entity and includes a plurality of facts that describe the entity, and each of the facts includes a plurality of fields, including attribute and value fields and one or more metrics, wherein the one or more metrics include a confidence level that indicates likelihood that the fact is correct and an importance level that indicates relevance of the fact to the object, compared to other facts for the same object;
    performing the search query in the fact repository by processing the plurality of facts in the fact repository to determine which of the plurality of facts are relevant to the search query and satisfy the restriction operator; and
    returning, from the fact repository, at least one object with at least one fact that is relevant to the search query and satisfies the restriction operator.

2. The method of claim 1, wherein processing further comprises processing fields other than those specified by the restriction operator in the plurality of facts to determine which of the plurality of facts are relevant to the search query.

3. The method of claim 1, wherein returning further comprises:
    returning an object having a fact that contains a term of the search query in an attribute of the fact, where the search query specifies that the term must be contained in an attribute.

4. The method of claim 1, wherein returning further comprises:
    returning an object having a fact that contains a term of the search query in a value of the fact, where the search query specifies that the term must be contained in a value.

5. The method of claim 1, wherein returning further comprises:
    returning an object whose facts contain a first term of the search query in a first fact and a second term of the search query in a second fact.

6. The method of claim 1, wherein returning further comprises:
    returning an object having a fact that contains both a first term of the search query and a second term of the search query, where the search query specifies that the first and second terms must be in the fact.

7. The method of claim 1, wherein returning further comprises:
    returning an object whose facts contain a first term of the search query in a first fact and a second term of the search query in a second fact, where the search query specifies that the first and second terms must be in different facts.

8. The method of claim 1, wherein returning further comprises:
    returning an object whose facts contain a first term of the search query as an attribute name of a first fact and a second term of the search query as a value of the first fact, where the search query specifies that the first and second terms must be an attribute and value pair in the first fact.

9. The method of claim 1, wherein receiving the search query further comprises receiving the search query as part of an http request.

10. The method of claim 1, wherein processing the plurality of facts to determine which are relevant to the search query further comprises determining which attributes and values in the plurality of facts match terms of the search query.

11. The method of claim 10, wherein returning objects whose facts are relevant to the search query further comprises determining which objects to return in accordance with logical operators in the search query.

12. The method of claim 1, further comprising ranking returned objects by relevance and displaying portions of at least two of the returned objects in accordance with their rankings.

13. The method of claim 1, wherein a search query of the format:

[A B]

requires that terms A and B are in a respective fact.

14. The method of claim 1, wherein a search query of the format:

[A:B]

requires that terms A and B, respectively, match an attribute and value pair of a fact.

15. The method of claim 1, wherein the receiving further comprises, when the search terms include a first and second search term, matching the first term in a first field of the fact and matching the second term in a second field of the fact.

16. The method of claim 1, wherein the objects whose at least one fact is relevant to the search query includes at least one fact that contains a term of the search query in at least one of an attribute and a value of the fact and at least one other fact that does not contain the terms of the search query in at least one of an attribute and a value of the fact.

17. A system to allow a user to search a fact repository, comprising:
one or more processors;
memory; and
one or more programs stored in the memory, the one or more programs comprising instructions to:
receive at the fact repository a search query provided by a user from a single generic search query box of a web based search engine configured to perform both web search queries in web documents and fact repository queries in the fact repository, the query including a restriction operator and a plurality of search terms, wherein the restriction operator is selected from a group consisting of: a fact restriction operator that causes a single fact to be searched for the search terms, wherein the plurality of search terms need not all appear in a single field, and a field restriction operator that causes any single unspecified field of a fact to be searched for all of the search terms, wherein the fact repository includes objects and facts extracted from unstructured documents or web pages, wherein each of the objects represents an entity and includes a plurality of facts that describe the entity, and each of the facts includes a plurality of fields, including attribute and value fields and one or more metrics, wherein the one or more metrics include a confidence level that indicates likelihood that the fact is correct and an importance level that indicates relevance of the fact to the object, compared to other facts for the same object;
performing the search query in the fact repository by processing the plurality of facts in the fact repository to determine which of the plurality of facts are relevant to the search query and satisfy the restriction operator; and
return, from the fact repository, at least one object with at least one fact that is relevant to the search query and satisfies the restriction operator.

18. The method of claim 1, further comprising further searching the returned objects, to further refine search results.

19. The method of claim 1, further comprising reviewing a source value in the plurality of facts in the fact repository to determine which of the plurality of facts are relevant to the search query, each of the plurality of facts including an attribute, a value, and a source value.

20. The method of claim 1, further comprising reviewing values in a fact of the plurality of facts in the fact repository other than those specified by the restriction operator to determine which of the plurality of facts are relevant to the search query, each of the plurality of facts including an attribute, a value, and the additional value.

21. A non-transitory computer readable storage medium storing one or more programs configured for execution by a computer, the one or more programs comprising instructions to:
receive at the fact repository a search query provided by a user from a single generic search query box of a web based search engine configured to perform both web search queries in web documents and fact repository queries in the fact repository, the query including a restriction operator and a plurality of search terms, wherein the restriction operator is selected from the group consisting of: a fact restriction operator that causes a single fact to be searched for the search terms, wherein the plurality of search terms need not all appear in a single field, and a field restriction operator that causes any single unspecified field of a fact to be searched for all of the search terms, wherein the fact repository includes objects and facts extracted from unstructured documents or web pages, wherein each of the objects represents an entity and includes a plurality of facts that describe the entity, and each of the facts includes a plurality of fields, including attribute and value fields and one or more metrics, wherein the one or more metrics include a confidence level that indicates likelihood that the fact is correct and an importance level that indicates relevance of the fact to the object, compared to other facts for the same object;
perform the search query in the fact repository by processing the plurality of facts in the fact repository to determine which of the plurality of facts are relevant to the search query and satisfy the restriction operator; and
return, from the fact repository, at least one object with at least one fact that is relevant to the search query and satisfies the restriction operator.

* * * * *